United States Patent [19]

Tsuyumoto et al.

[11] Patent Number: 5,087,367
[45] Date of Patent: Feb. 11, 1992

[54] HYDROLYZED MEMBRANE AND PROCESS FOR THE PREPARATION OF THE SAME

[75] Inventors: Michio Tsuyumoto; Yasushi Maeda; Hiroki Karakane, all of Hyogo, Japan

[73] Assignee: Japan represented by Ministry of International Trade and Industry, Director-General Basic Industries Bureau, Tokyo, Japan

[21] Appl. No.: 392,527

[22] PCT Filed: Dec. 1, 1988

[86] PCT No.: PCT/JP88/01219
§ 371 Date: Jul. 21, 1989
§ 102(e) Date: Jul. 21, 1989

[87] PCT Pub. No.: WO89/05182
PCT Pub. Date: Jun. 15, 1989

[30] Foreign Application Priority Data

Dec. 2, 1987 [JP] Japan .................. 62-303368
Sep. 14, 1988 [JP] Japan .................. 63-228847

[51] Int. Cl.$^5$ .............................. B01D 71/64
[52] U.S. Cl. ................. 210/500.39; 210/654
[58] Field of Search ............ 210/634, 644, 649–654, 210/500.27, 500.42, 500.43, 500.37–500.39

[56] References Cited

U.S. PATENT DOCUMENTS

| | | |
|---|---|---|
| 3,963,662 | 6/1976 | Fujiwara et al. . |
| 4,268,662 | 5/1981 | Sano et al. . |
| 4,322,381 | 3/1982 | Joh . |
| 4,323,627 | 4/1982 | Joh . |
| 4,412,922 | 11/1983 | Mir . |
| 4,659,474 | 4/1987 | Perry et al. . |

FOREIGN PATENT DOCUMENTS

| | | |
|---|---|---|
| 52-122279 | 10/1977 | Japan . |
| 57-136903 | 8/1982 | Japan . |
| 58-92407 | 6/1983 | Japan . |
| 61-125409 | 6/1986 | Japan . |
| 63-182005 | 7/1988 | Japan . |
| 63-214304 | 9/1988 | Japan . |
| 1351187 | 4/1974 | United Kingdom . |
| 1569563 | 6/1980 | United Kingdom . |

*Primary Examiner*—Frank Sever
*Attorney, Agent, or Firm*—Flynn, Thiel, Boutell & Tanis

[57] ABSTRACT

A selectively water-permeable hydrolyzed membrane characterized in that it is mainly made of a material which can generate a carboxyl group by hydrolysis and that a part of the material is hydrolyzed to have carboxyl groups, which may be further coated with a hydrophilic polymer. The above membrane is useful as a selectively water-permeable membrane and is applicable not only to pervaporation and vapor permeation, but also to reverse osmosis, dehumidification of air and so on.

5 Claims, 2 Drawing Sheets

HYDROLYZED MEMBRANE AND PROCESS FOR THE PREPARATION OF THE SAME

TECHNICAL FIELD

The present invention relates to a selectively water-permeable membrane which is not only useful in pervaporation or vapor permeation, but also appliable to a wide field including reverse osmosis and dehumidification of air. The membrane may have any form arbitrarily selected depending upon the use. For example, it may be a flat membrane, a hollow yarn or fiber membrane or a tubular membrane.

BACKGROUND ART

Reverse osmosis methods have been put to practical use as methods of concentrating a low-concentration aqueous solution of an organic substance with a membrane. However, these reverse osmosis methods necessitate the application of a pressure higher than the osmotic pressure of a separation solution to a separative membrane, so that the methods cannot be applied to a high-concentration aqueous solution owing to its high osmotic pressure. Thus, the solution separable by the reverse osmosis methods is limited in concentration. Meanwhile, pervaporation and vapor permeation have been noted as a new separating method free from influence of osmotic pressure. Pervaporation is methods characterized in that a substance to be separated is made to permeate a membrane in a gaseous state by feeding a separation solution to the primary side of the membrane, while reducing the pressure of the secondary side thereof or passing a carrier gas through the secondary side. On the other hand, vapor permeation is different from pervaporation in that a vapor mixture is fed to the primary side. The membrane-permeating substance can be recovered by condensing the permeating vapor under cooling. With respect to pervaporation, many studies have been made. For example, U.S. Pat. Nos. 3,750,735 and 4,067,805 disclose the separation of an organic substance from water with a polymer having an active anionic group, while U.S. Pat. Nos. 2,953,502 and 3,035,060 disclose the separation of ethanol from water with a cellulose acetate or polyvinyl alcohol membrane. Further, Japanese Patent Laid-Open No. 109,204/1984 discloses a cellulose acetate membrane and a polyvinyl alcohol membrane, while Japanese Patent Laid-Open No. 55,305/1984 discloses a crosslinked polyethyleneimine membrane. However, these membranes disclosed in the references are too poor in separation performance, particularly in permeation rate, to be put to practical use. Meanwhile, Japanese Patent Laid-Open No. 129,104/1985 discloses a membrane prepared from an anionic polysaccharide or a polysaccharide derivative as a membrane excellent in separation performance. However, this membrane has inherent unavoidable problems resulting from the nature of a natural high-molecular weight compound, for example, depolymerization with acid or alkali or decomposition with bacteria, so that the endurance and chemical resistance of the membrane fall short of expectations.

Generally, a hydrophobic separative membrane has disadvantages in that the surface thereof is hardly wettable and readily dries and that it tends to cause adsorption or clogging frequently. Therefore, for the purpose of overcoming these disadvantages, it has been attempted to impart a hydrophilic nature to such a membrane by various methods. For example, a method of adding a polyhydric alcohol such as polyethylene glycol or glycerin to a hydrophobic separative membrane has been generally adopted. However, the membrane thus improved in hydrophilic nature is disadvantageous in that the additives contained in the membrane are dissolved out into a filtrate in service. Further, Japanese Patent Publication No. 16187/1981 discloses a method which comprises applying a water-soluble polymer to a hydrophobic separative membrane by dipping and insolubilizing the applied water-soluble polymer by irradiation with electron beams, crystallization through heating or chemical reaction with formaldehyde or glyoxal to thereby impart a hydrophilic nature to the membrane. However, this method is disadvantageous in that it necessitates complicated operation so that it is unsuitable for practical use and that defects are often generated. Furthermore, Japanese Patent Laid-Open No. 35862/1983 discloses a method for imparting a hydrophilic nature to a hydrophobic porous filter membrane which comprises etching a polysulfone filter membrane in an atmosphere of vacuum electric discharge by sputtering. However, this method is disadvantageous in that the resulting porous filter membrane exhibits remarkably lowered mechanical strength.

DISCLOSURE OF INVENTION

An object of the present invention is to prepare a separative membrane having selective permeability to water which exhibits sufficient endurance and excellent permeation rate and separation factor by hydrolysis, which is a simple chemical treatment, without the formation of a thin film such as coating.

The term "permeation rate" used in this specification refers to the amount of a mixture permeating a membrane per unit area of the membrane and unit time and is shown by $kg/m^2.hr$, while the term "separation factor $(\alpha)$" refers to the ratio of the ratio of water to organic substance with respect to a permeation gas to that with respect to a feed solution or vapor, i.e., $a_y{}^x = (X/Y)_p/(X/Y)_f$. In this equation, X and Y are the contents of water and organic substance in the two systems respectively, and p and f stand for "permeation" and "feed", respectively.

The inventors of the present invention have intensively studied to overcome the above disadvantages and have found that a selectively water-permeable membrane having excellent performance can be obtained by the hydrolysis of a membrane material itself. Namely, the present invention relates to a selectively water-permeable hydrolyzed membrane characterized in that it is mainly made of a material which can generate a carboxyl group by hydrolysis and that a part of the material is hydrolyzed to contain carboxyl groups. The material may be used as a blend or copolymer thereof with other material. Further, it is a matter of course that the use of the material in a crosslinked state is preferable from the standpoint of the form retention of a membrane. Particular examples of the material include, polyacrylonitrile and a polymer of the acid-ester type and the acid-amide type. Hydrolysis of such a material can be representatively carried out by forming the material into a membrane and dipping the membrane in an acid or alkaline solution. Particularly, a dipping process using a solution of an alkali such as potassium hydroxide, sodium hydroxide or barium hydroxide is preferable from the standpoint of the balance between the hydrolysis rate and the form retention. Although the degree of hydrolysis varies depending upon the kind of the material or the state thereof (i.e., blend, copolymer, crosslinked or uncrosslinked), it can be suitably adjusted by selecting the kind of acid or alkali to be used, concentration or treatment time. The complete hydrolysis of the material is unfavorable, because it tends to convert the material into a water-soluble gel in many cases, though there is a difference depending upon the kind of the material used. On the contrary, when the degree of hydrolysis is too low, the separating function of the resulting membrane will be unfavorably low. Alternatively, the object of the present invention can be attained by bringing only the surface of a membrane into contact with a treatment solution to thereby carry out the hydrolysis.

The reaction route of the hydrolysis of polyacrylonitrile with an alkaline solution is presumably as follows:

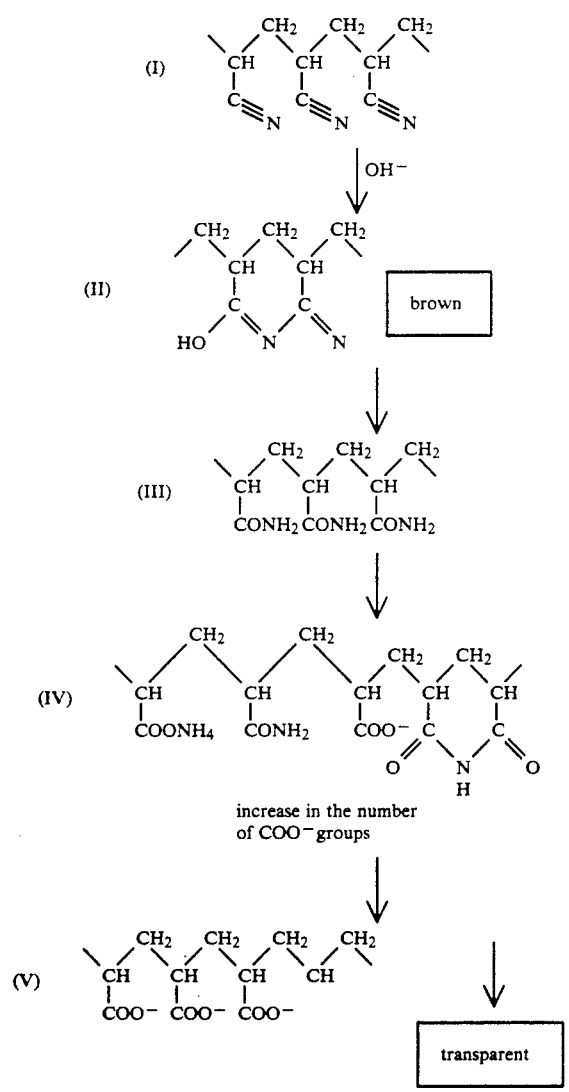

Accordingly, the hydrolysis treatment may be arbitrarily discontinued during the turning of the color of a membrane from brown into transparence.

A suitably hydrolyzed membrane as prepared above contains carboxyl groups of free acid form or various metal or amine salt forms depending upon the treatment solution used and can be used even as such as a selectively water-permeable membrane. However, it is preferable from the standpoint of enhancing the performance of a membrane and the stability thereof that such a membrane be reacted with a cationic polymer to form a polyion complex. Particular examples of the cationic polymer include polyethyleneimine, polyallylamine, polyvinylpyridine and ionene polymers containing quaternary ammonium salt group in its main chain. Further the formation of a polyion complex can be easily attained only by dipping a hydrolyzed membrane as described above in a solution of a cationic polymer.

Furthermore, a hydrolyzed membrane as prepared above is easily improved further in performance by applying a hydrophilic polymer to the surface thereof by coating.

Namely, the present invention provides a composite membrane prepared by applying a hydrophilic synthetic polymer to a partially hydrolyzed polyacrylonitrile base membrane and a process for the preparation of a composite membrane which comprises coating a polyacrylonitrile base membrane with a hydrophilic synthetic polymer, characterized in that the polyacrylonitrile base membrane is partially hydrolyzed prior to the coating to thereby enhance the hydrophilicity of the base membrane.

Representative examples of the hydrophilic synthetic polymer include polyacrylic acid and polyvinyl alcohol, though the hydrophilic synthetic polymer is not limited to them. When the coating solution is an anionic polymer such as polyacrylic acid, it is preferred from the standpoint of enhancing the performance of a membrane or the safety that anionic polymer be reacted with a cationic polymer to form a polyion complex. Particular examples of the cationic polymer include polyethyleneimine, polyallylamine, polyvinylpyridine and ionene polymers containing quaternary ammonium salt groups in their main chains, though the cationic polymer is not limited to them. The formation of a polyion complex can be easily attained merely by dipping a hydrolyzed membrane coated with an anionic polymer in a solution of a cationic polymer. When a base membrane having an anionic group such as a carboxyl group is used, it is apparent that a cationic polymer can be easily applied to such a base membrane prior to the application of an anionic polymer owing to the interaction between the ions.

According to the present invention, an excellent separative membrane having selective permeability to water can be obtained by dipping a commercially available reverse osmosis membrane, ultrafiltration membrane or a ultra-micro filtration membrane as such in an aqueous solution of an acid or an alkali for a specified time to thereby hydrolyze the membrane, without employing any coating step which necessitates advanced technique. Further, the membrane thus prepared can be easily coated with a hydrophilic polymer by virtue of the improved compatibility of the surface of the membrane with a hydrophilic polymer.

According to the present invention, a lot of materials can be treated at once with conventional equipment, which is very advantageous in production cost. The selectively water-permeable hydrolyzed membrane according to the present invention exhibits particularly excellent selective permeability for water in pervaporation and can be used not only in the dehydration of various solutions containing organic substances but also in a wide range of uses including vapor permeation, dialysis, reverse osmosis and dehumidification of air by utilizing its characteristics.

BEST MODE FOR CARRYING OUT THE INVENTION

Figure 1:
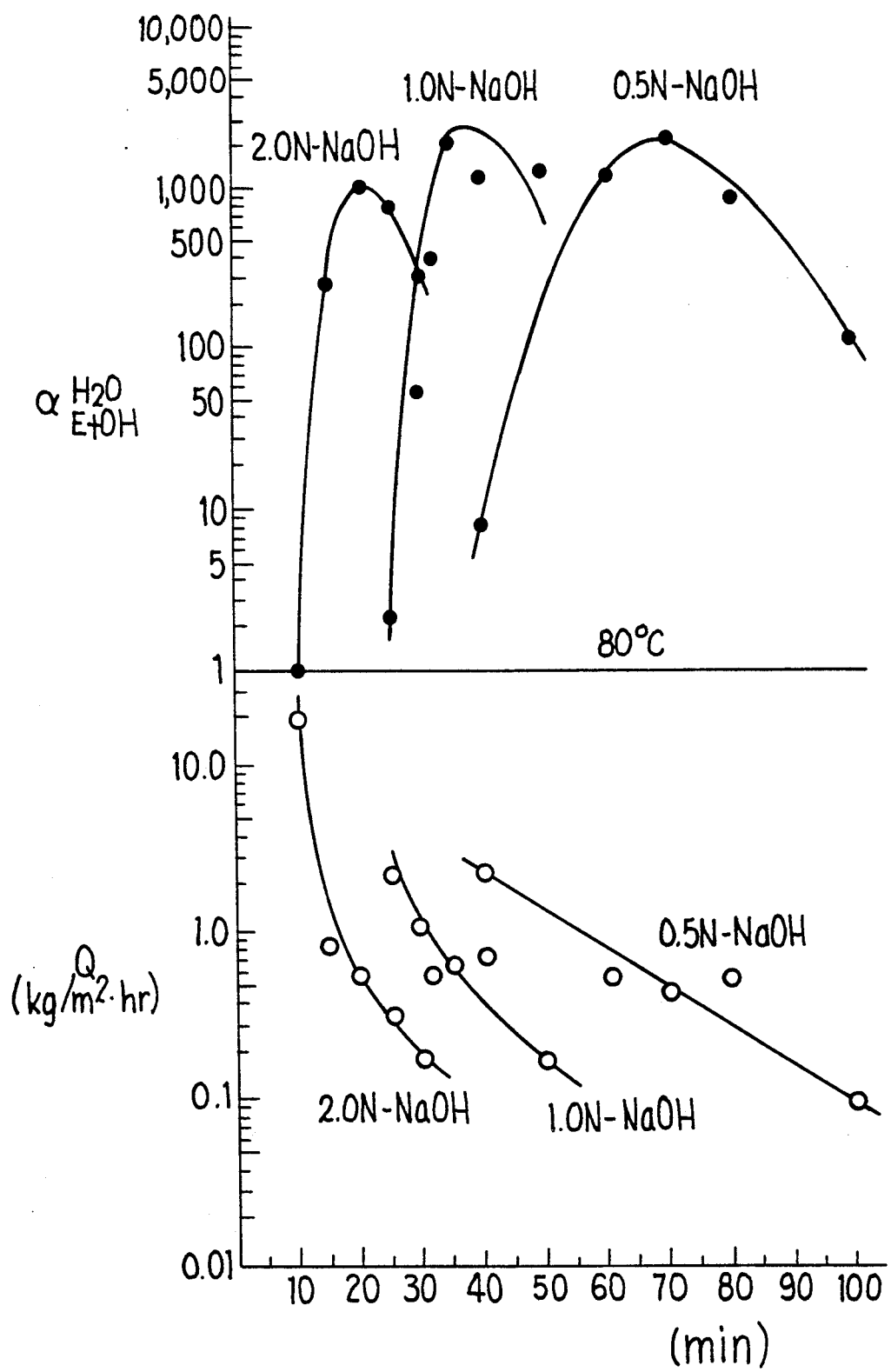
FIG. 1 is a graph showing a relationship between the membrane performance and the alkali concentration or dipping time in the treatment at 80° C.

The present invention will now be described in more detail by referring to the following Examples.

EXAMPLE 1

A reverse osmosis membrane made of polyacrylonitrile, Solrocks, made by Sumitomo Chemical Co., Ltd., was dipped in a 1N aqueous solution of NaOH at 80° C. for 13 minutes to carry out the hydrolysis of the membrane. The excessive alkali was rinsed out of the membrane with water. The resulting membrane was examined for selective permeability to water by pervaporation (feed solution: 95% by weight aqueous ethanol, 70° C.). The permeation rate was 1.0 kg/m$^2$.hr and the separation factor was 100.

EXAMPLE 2

The hydrolyzed membrane prepared in Example 1 was dipped in an aqueous solution of a polycation of an ionene type PCA-107 having a structure which will be described below, overnight to form a polyion complex. The resulting membrane was examined for selective permeability to water under the same conditions as those of Example 1. The permeation rate was 0.81 kg/m$^2$.hr and the separation factor was 850.

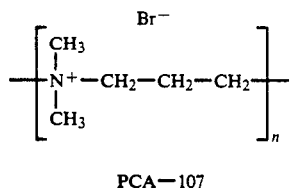

PCA—107

COMPARATIVE EXAMPLE 1

A Solvocks membrane was examined as such (without being hydrolyzed) for selective permeability to water under the same conditions as those of Example 1. The permeation rate was 4.0 kg/m$^2$.hr and the separation factor was 2.8. Although the membrane exhibited a high permeation rate, it hardly exhibited selective permeability to water.

COMPARATIVE EXAMPLE 2

A Solrocks membrane was dipped in a 1N aqueous solution of NaOH at 80° C. for 60 minutes to carry out the hydrolysis. The polyacrylonitrile of the membrane was excessively hydrolyzed into polysodium acrylate, so that the membrane gelled to lose its form.

EXAMPLE 3

A dope prepared by dissolving polyacrylonitrile (a product of Du Pont) in N,N-dimethylformamide at a weight ratio of 1:9 was cast on a polyester woven textile in a casting thickness of 250 μm and immediately dipped in water to carry out its solidification. Thus, a flat membrane of polyacrylonitrile was obtained.

This membrane was dipped in a 1N aqueous solution of NaOH at 80° C. for 24 minutes to carry out the hydrolysis. The excessive alkali was rinsed out of the hydrolyzed membrane with water. The resulting membrane was dipped in an aqueous solution of a polycation of an ionene type, PCA-107, overnight to form a polyion complex. The membrane was examined for selective permeability to water under the same conditions as those of Example 1. The permeation rate was 0.94 kg/m$^2$.hr and the separation factor was 1480.

COMPARATIVE EXAMPLE 3

The flat polyacrylonitrile membrane prepared in Example 3 was examined as such (without being hydrolyzed) for selective permeability to water. The membrane hardly exhibited any separating function for a water/ethanol mixture.

EXAMPLE 4

A flat polyacrylonitrile ultrafiltration membrane, DUY-M (a product of Daicel Chemical Industries, Ltd., polyacrylonitrile content: about 70%) was dipped in a 1N aqueous solution of NaOH at 78° to 85° C. for 30 minutes to carry out the hydrolysis. The excessive alkali was rinsed out of the hydrolyzed membrane with water. The resulting membrane was examined for selective permeability to water under the same conditions as those of Example 1. The permeation rate was 1.0 kg/m$^2$.hr and the separation factor was 40.

COMPARATIVE EXAMPLE 4

A DUY-M flat membrane was examined as such (without being hydrolyzed) for selective permeability to water under the same conditions as those of Example 1. The membrane hardly exhibited any separating function for a water/ethanol mixture.

COMPARATIVE EXAMPLE 5

A DUY-M flat membrane was dipped in a 1N aqueous solution of NaOH at 78° to 85° C. for 60 minutes to carry out the hydrolysis. The polyacrylonitrile membrane was excessively hydrolyzed into polysodium acrylate, so that the membrane gelled to lose its form.

EXAMPLE 5

The hydrolyzed membrane prepared in Example 4 was dipped in an aqueous solution of a polycation of an ionene type, PCA-107, overnight to form a polyion complex. The resulting membrane was examined for selective permeability to water under the same conditions as those of Example 1. The permeation rate was 1.0 kg/m$^2$.hr and the separation factor was 540.

EXAMPLE 6

A DUY-M flat membrane was dipped in a 0.1N aqueous solution of Ba(OH)$_2$ at 78° to 85° C. for 150 minutes to carry out the hydrolysis. The excessive alkali was rinsed out of the hydrolyzed membrane with water. The resulting membrane was dipped in an aqueous solution of a polycation of an ionene type, PCA-107, overnight to form a polyion complex. The resulting membrane was examined for selective permeability of water under the same conditions as those of Example 1. The permeation rate was 0.7 kg/m².hr and the separation factor was 190.

EXAMPLE 7

A flat polyacrylonitrile ultrafiltration membrane, DUY-M (a product of Daicel Chemical Industries, Ltd., polyacrylonitrile content: about 70%) was dipped in a 1N aqueous solution of NaOH at 78° to 85° C. for 30 minutes to carry out the hydrolysis. The excessive alkali was rinsed out of the membrane with water, dired and examined with ATR-IR. The presence of ionized carboxyl groups was confirmed by the absorption at 1400 and 1550 cm$^{-1}$, which reveals that a hydrophilic nature was imparted to the membrane. The hydrophilic membrane thus obtained was examined for separating function for a water/ethanol mixture (evaluation solution: 95% by weight ethanol, 60° C.) by pervaporation. The separation factor was about 40 and the permeation rate was 1 kg/cm².hr.

EXAMPLE 8

Five minimodules having a surface area of about 70 cm² were produced by the use of a hollow yarn (inside diameter/outside diameter = 1.0/1.5 mm) made of a polyacrylonitrile-base polymer (content: about 90%). 1N-NaOH was passed through the inside of the yarn of the module at 80° C. for 15 minutes to hydrolyze the inside surface of the yarn slightly. Then, a 0.5% aqueous solution of a polyacrylic acid having a molecular weight of 4,000,000 was passed through the inside of the yarn for 10 seconds, followed by drying with hot air at 50° C. A 2% aqueous solution of a polycation of an ionen type, PCA-107, was passed through the inside of the resulting yarn to form a polyion complex, followed by air drying. In order to prevent the generation of defective areas, the above procedure from the application of polyacrylic acid to the formation of a polyion complex was repeated twice. The resulting module was examined for selective permeability to water in a similar manner to that of Example 7. Each of the five modules exhibited a high separation factor exceeding 800. In such an evaluation method, the smaller the defective area such as unevenly coated area, the higher the separation factor. Accordingly, the membrane is estimated to be nearly uniformly coated.

COMPARATIVE EXAMPLE 6

The same procedure as that described in Example 8 was repeated except that the polyacrylonitrile hollow yarn was used as such as a base membrane without being hydrolyzed. Three of the five resulting modules each exhibited a separation factor exceeding 800.

EXAMPLE 9

In a similar manner to that described in Example 8, a polyacrylonitrile hollow yarn was hydrolyzed and converted into a polyion complex by passing a 2% aqueous solution of a polycation of an ionene type, PCA-107, therethrough except that the hollow yarn was not coated with polyacrylic acid. The resulting membrane was examined for performance in a similar manner to that of Example 1. The separation factor was about 3 and the permeation rate was 10 kg/m².hr or above.

COMPARATIVE EXAMPLE 7

The same procedure as that described in Example 9 was repeated except that the yarn was not hydrolyzed. The resulting membrane was examined for performance in a similar manner to that of Example 7. It exhibited a separation factor of about 1 and no selective permeability of water.

EXAMPLE 10

Figure 2:
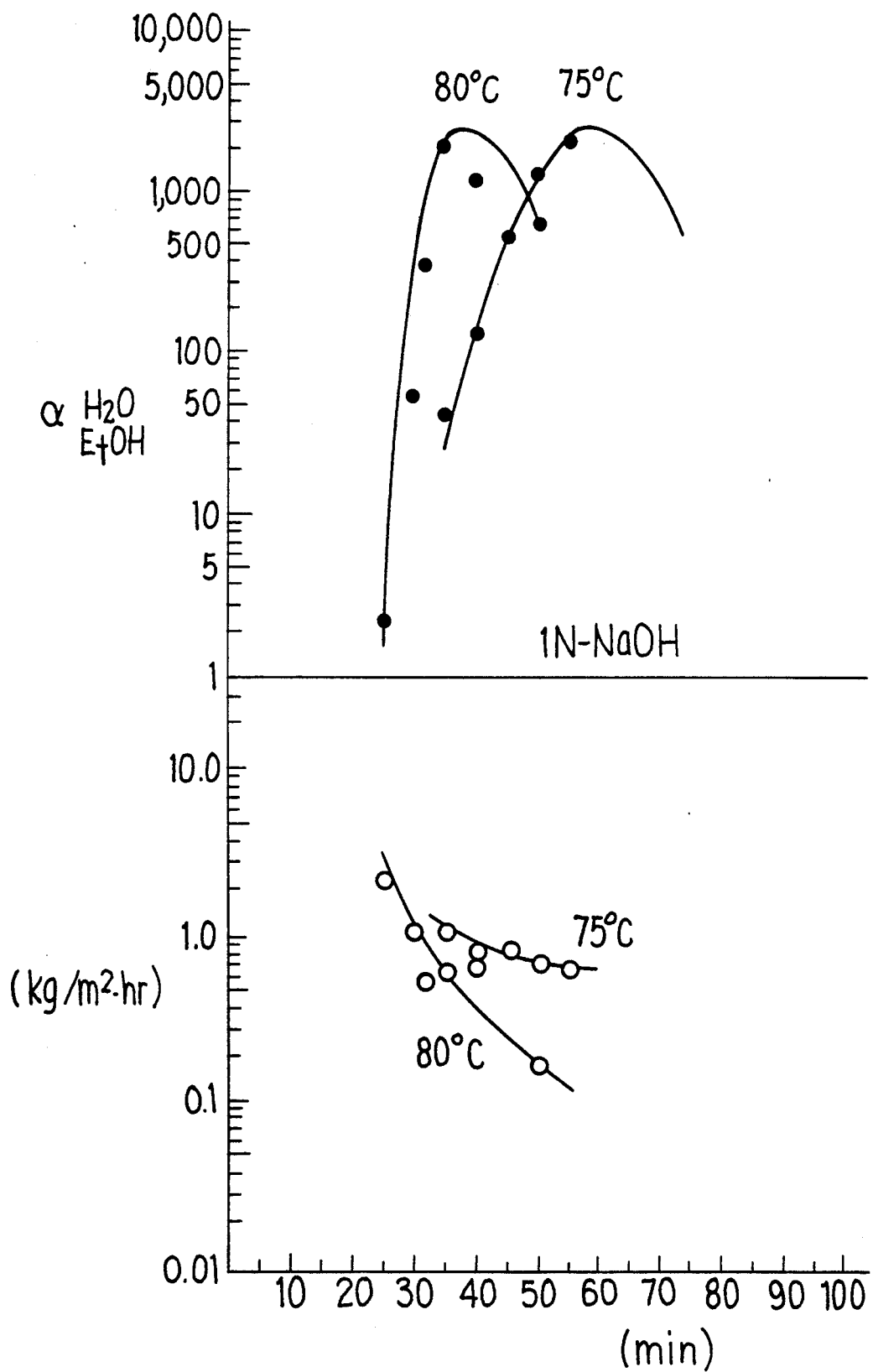
FIG. 2 is a graph showing a relationship between the membrane performance and the temperature of alkali solution or dipping time in the treatment with 1N-NaOH.

A hollow yarn having an inside diameter of 1 mm and an outside diameter of 1.5 mm was produced by the use of a polyacrylonitrile-base polymer (polyacrylonitrile/vinyl acetate = 9/1) by dry-wet spinning. This yarn had pores having a size of 0.3 μm on the outside surface and those having a size of several hundreds of Å on the inside surface. The hollow fiber exhibited a permeation rate of pure water of about 8 l/min.m².atm and a rejection rate for bovine serum albumin of about 10%. The membrane was dipped in a 1N aqueous solution of NaOH to hydrolyze a part of the membrane. The excessive alkali was rinsed out of the membrane with water. The resulting membrane was dipped in an aqueous solution of a polycation of an ionene type, PCA-107, overnight to form a polyion complex. The hydrolysis of the membrane was carried out at a constant dipping temperature, while varying the concentration of the NaOH solution and dipping time. The resulting membrane was examined for selective permeability of water by pervaporation (feeding a 95% by weight aqueous ethanol of 60° C. into the inside of the membrane, while evacuating the outside thereof). The results are shown in FIG. 1. Separately, the hydrolysis was carried out with an aqueous solution of NaOH having a constant concentration, while varying the dipping temperature and dipping time. The resulting membrane was examined for selective permeability of water. The results are shown in FIG. 2. As shown in these figures, the permeation rate lowered with the lapse of the dipping time while the separation factor temporarily increased to reach a peak and then lowered independent of the concentration of the aqueous solution of NaOH or the dipping temperature. The lower the concentration or temperature of the alkali solution, the longer the time which has elapsed until the separation factor reaches a peak and the more moderate the change in the separation factor or the permeation rate, i.e., the easier the control of the performance of a membrane. Further, among the hollow yarns shown in the figures, the best-performance one exhibited a permeation rate of 0.6 to 0.7 kg/m².hr and a separation factor of 2,000 to 3,000.

We claim:

1. A composite membrane prepared by applying a hydrophilic synthetic polymer alternative to polyacrylonitrile, having a carboxyl or a hydroxyl group on a partially hydrolyzed polyacrylonitrile base membrane, and having properties for separating at least water from ethanol by pervarporation.

2. A composite membrane as set forth in claim 1, wherein said hydrophilic synthetic polymer is selected from the group consisting of polyacrylic acid and polyvinyl alcohol.

3. A selectively water-permeable hydrolyzed membrane for pervaporation or vapor permeation, which comprises a polyion complex formed by the reaction of a cationic polymer selected from the group consisting of polyethylene imine, polyallylamine, polyvinylpyridine and an ionene polymer having a quaternary ammonium salt group in the main chain and an anionic polymer containing a carboxylic group produced by a hydrolysis reaction, and having properties for separating at least water from ethanol by pervaporation.

4. A selectively water-permeable hydrolyzed membrane as set forth in claim 3, wherein said anionic polymer is a polyacrylonitrile polymer.

5. A selectively water-permeable hydrolyzed membrane as set forth in claim 3 wherein said cationic polymer is an ionene polymer containing a quaternary ammonium salt group in its main chain.

* * * * *